US012762789B2

(12) United States Patent
Garman et al.

(10) Patent No.: US 12,762,789 B2
(45) Date of Patent: Oct. 13, 2026

(54) SYNTHESIZING A VISUAL CHARACTERISTIC IN A 3-DIMENSIONAL PRINT

(71) Applicant: Sky Castle Studios, LLC, San Francisco, CA (US)

(72) Inventors: Adam Garman, Waterbeach (GB); Teagan Morrison, Santa Monica, CA (US)

(73) Assignee: SKY CASTLE STUDIOS, LLC, San Francisco, CA (US)

( * ) Notice: Subject to any disclaimer, the term of this patent is extended or adjusted under 35 U.S.C. 154(b) by 795 days.

(21) Appl. No.: 18/104,738

(22) Filed: Feb. 1, 2023

(65) Prior Publication Data

US 2024/0257447 A1 Aug. 1, 2024

(51) Int. Cl.

| | |
|---|---|
| ***G06T 15/50*** | (2011.01) |
| ***B33Y 50/00*** | (2015.01) |
| ***G05B 19/4099*** | (2006.01) |
| ***G06T 19/20*** | (2011.01) |

(52) U.S. Cl.

CPC ............ *G06T 15/506* (2013.01); *B33Y 50/00* (2014.12); *G05B 19/4099* (2013.01); *G06T 19/20* (2013.01); *G05B 2219/35134* (2013.01); *G05B 2219/49023* (2013.01); *G06T 2219/2016* (2013.01)

(58) Field of Classification Search

CPC .................. G06T 15/506; G06T 19/20; G06T 2219/2016; B33Y 50/00; G05B 19/4099; G05B 2219/35134; G05B 2219/49023

See application file for complete search history.

(56) References Cited

U.S. PATENT DOCUMENTS

| | | | | |
|---|---|---|---|---|
| 2019/0026937 | A1* | 1/2019 | Benoît | G06T 15/506 |
| 2022/0343592 | A1* | 10/2022 | Delgado | G06T 15/04 |
| 2023/0041333 | A1* | 2/2023 | Hillier | G06T 19/20 |

* cited by examiner

*Primary Examiner* — Zhipeng Wang

(74) *Attorney, Agent, or Firm* — ALONZO + ASSOCIATES; Arlyn Alonzo

(57) ABSTRACT

Aspects of the disclosure are directed to three-dimensional (3D) printing. In accordance with one aspect, a method for generating a three-dimensional (3D) print include modifying a plurality of digital materials of a lighting-modified 3D digital model to generate a materials-modified 3D digital model based on a plurality of simulated characteristics; modifying one or more model parameters of the materials-modified 3D digital model to generate a parameters-modified 3D digital model; and transforming an interaction between a modified digital lighting and a modified digital material in the parameters-modified 3D digital model to generate a transformed 3D digital model.

18 Claims, 11 Drawing Sheets

700

800

SYNTHESIZING A VISUAL CHARACTERISTIC IN A 3-DIMENSIONAL PRINT

TECHNICAL FIELD

This disclosure relates generally to the field of three-dimensional (3D) printing, and, in particular, to synthesizing a visual characteristic in a 3D print.

BACKGROUND

Three-dimensional (3D) printing systems are used in a variety of applications which generate a physical assembly of shapes based on a digital model to produce a physical object, such as a 3D print (or 3D color print). The digital model may be a 3D digital model which numerically represents an object in three spatial dimensions. The 3D digital model may be modified prior to the production of the 3D print (or the 3D color print). There are many forms of modification that may be used to produce the 3D print (or the 3D color print) which aim to synthesize or preserve a desired visual characteristic in the 3D print (or the 3D color print).

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a 3D print. Accordingly, a method for generating a three-dimensional (3D) print, the method including modifying a plurality of digital materials of a lighting-modified 3D digital model to generate a materials-modified 3D digital model based on a plurality of simulated characteristics; modifying one or more model parameters of the materials-modified 3D digital model to generate a parameters-modified 3D digital model; and transforming an interaction between a modified digital lighting and a modified digital material in the parameters-modified 3D digital model to generate a transformed 3D digital model.

In one example, the method further includes rasterizing the transformed 3D digital model into a parameter space of a 3D model file to generate a rasterized 3D digital model. In one example, the method further includes providing the rasterized 3D digital model to a 3D printer to create a 3D print. In one example, the method further includes modifying a digital lighting of a three-dimensional (3D) digital model to generate the lighting-modified 3D digital model. In one example, the method further includes configuring the lighting-modified 3D digital model to attenuate one or more directional light paths. In one example, the method further includes attenuating the one or more directional light paths by dimming the digital lighting from a specular reflection.

In one example, the method further includes configuring the 3D digital model to use a physically based rendering (PBR) to store one or more image parameters for each point of a surface of the 3D digital model to represent one or more simulated characteristics. In one example, the method further includes using the one or more image parameters as inputs to a shading calculation. In one example, the method further includes using the physically based rendering (PBR) to approximate a bidirectional reflectance distribution function (BRDF) and a rendering equation.

In one example, the bidirectional reflectance distribution function (BRDF) describes one or more reflectance properties of the surface as a function of lighting geometry and observation geometry. In one example, the rendering equation defines a relationship between an incident illumination function and a reflected illumination function using the bidirectional reflectance distribution function (BRDF). In one example, the one or more image parameters include at least one of the following: an albedo color metric, a roughness metric, a metalness metric, or a transparency metric.

In one example, the albedo color metric is a numeric representation of relative reflectance versus wavelength $\lambda$ over a portion of an electromagnetic spectrum in a propagation medium for the plurality of digital materials. In one example, the roughness metric is a numeric representation of a variation of a surface height relative to a reference surface for the plurality of digital materials. In one example, the metalness metric is a numeric representation of metal proportion for the plurality of digital materials. In one example, the transparency metric is a numeric representation of transmissivity through a surface of the plurality of digital materials. In one example, an ambient occlusion parameter of the materials-modified 3D digital model is an occlusion integral.

In one example, the method further includes scaling the ambient occlusion parameter of the materials-modified 3D digital model to a lower non-zero value. In one example, the modifying the plurality of digital materials of the lighting-modified 3D digital model is implemented by using a linear weighted superposition of one or more image parameters and one or more conjugate parameters. In one example, the transformed 3D digital model is view-independent.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
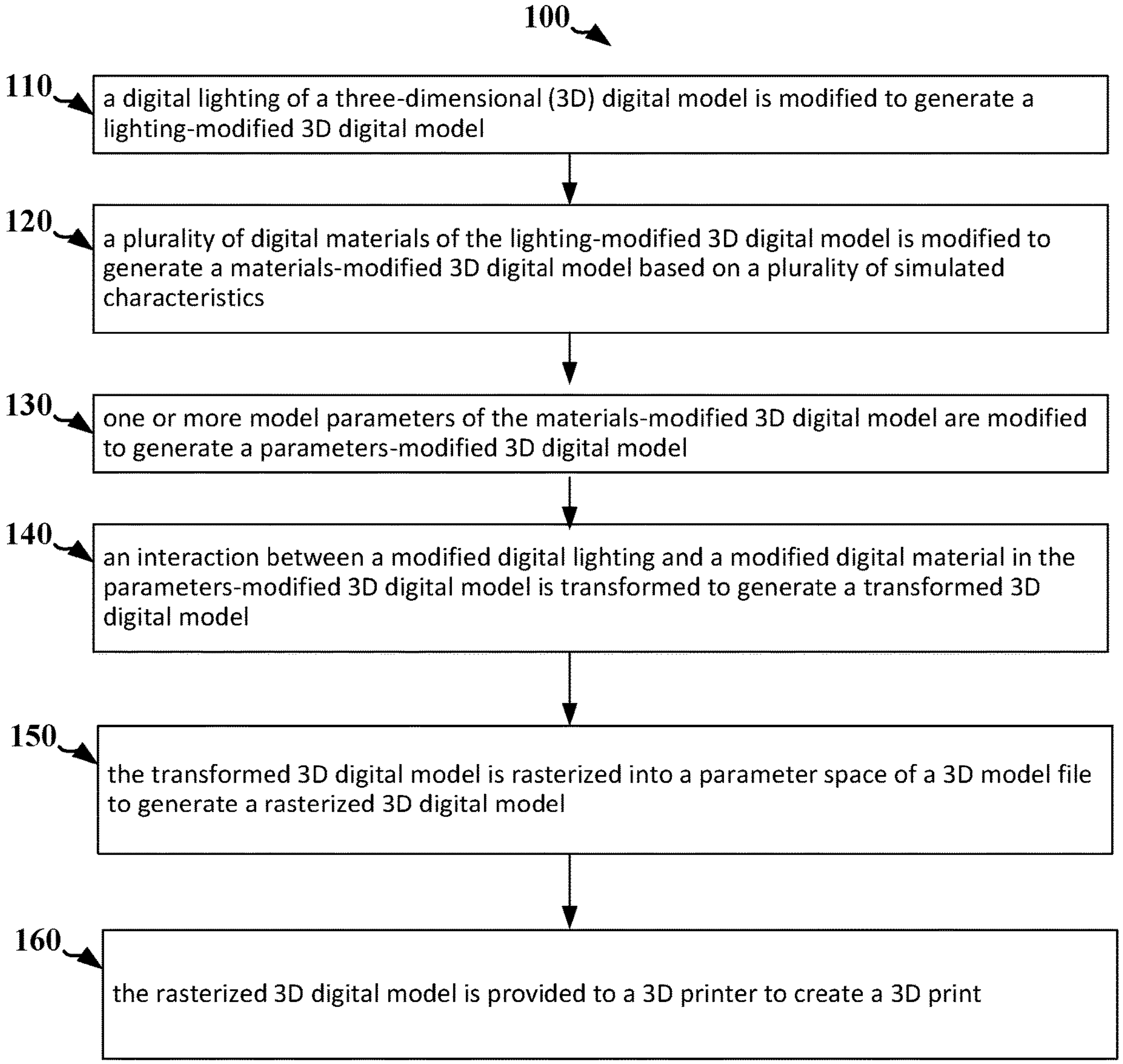
FIG. 1 illustrates an example flow diagram 100 for generating a three-dimensional (3D) print from a 3D digital model.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, a 3D digital model is a numeric representation of an object which may be manipulated in a plurality of degrees of freedom and may be manipulated in a plurality of image characteristics. For example, the numeric representation may be a digital coding of a 3D representation of the object. The digital coding may include, for example, a digital value which specifies image intensity or amplitude. The image intensity or amplitude may be specified for a single monochromatic component (i.e., color) of the object. In one example, the digital value may be linear in intensity (i.e., an increase in intensity maps into a proportional increase in digital value). In one example, the digital value may be logarithmic in intensity (i.e., an increase in logarithmic intensity maps into a proportional increase in digital value). Other functional mappings from intensity (or amplitude) to digital value may also be used.

In one example, the manipulation of the 3D digital model may be performed by a processor (e.g., computer, microprocessor, core processor, system on a chip, etc.). For example, manipulation in a plurality of degrees of freedom may include translation in three spatial dimensions (e.g., Cartesian coordinates x,y,z), rotation in three spatial dimensions (e.g., rotational coordinates, Euler angles, quaternions, etc.), rescaling (e.g., reshaping), or any combination of these operations. For example, the manipulation in a plurality of image characteristics may include modification of reflectance, transmittance, emittance, angle of reflection, surface roughness, faceting, etc. which may affect the visual appearance of an image.

In one example, the 3D digital model may be displayed using graphical techniques which simulate an appearance of a variety of materials, such as, mirrors, metals, plaster, etc. to produce simulated materials. For example, a 3D printer may not be able to print materials with the same physical properties as the simulated materials. For example, a design goal in 3D printing is to preserve a visual characteristic of simulated materials in a 3D print. In one example, the 3D printing may modify digital lighting, surfaces, materials, lighting calculations, etc. Although the present disclosure and some of its examples may be disclosed as color 3D prints (or 3D color prints), one skilled in the art would understand that the disclosure is not exclusive to color prints and that 3D prints (either color or not) are within the spirit and scope of the present disclosure. Similarly, although some of the examples are disclosed as 3D prints, one skilled in the art would understand that 3D color prints are also within the spirit and scope of these disclosed examples.

FIG. 1 illustrates an example flow diagram 100 for generating a three-dimensional (3D) print from a 3D digital model. In block 110, a digital lighting of a three-dimensional (3D) digital model is modified to generate a lighting-modified 3D digital model. In one example, the lighting-modified 3D digital model attenuates one or more directional light paths. In one example, modifying digital lighting may increase or reduce a numeric representation of the digital lighting. For example, the numeric representation may be a digital coding of a 3D representation of an object. The digital coding may include, for example, a digital value which specifies image intensity or amplitude. The image intensity or amplitude may be specified for a single monochromatic component (i.e., color) of the object. In one example, the image intensity may be a numeric value which represents a physical intensity in an image. In one example, the physical intensity in the image is a measure of illumination over a finite solid angle as observed by a sensor or recipient at some position relative to the image. For example, the physical intensity may be measured in physical units such as watts per steradian, where a solid angle is described in terms of steradians.

In one example, a directional light path may be a specular reflection from solar visible illumination. For example, attenuating directional light paths may be performed by dimming the digital lighting from the specular reflection. That is, dimming the digital lighting reduces the numeric representation of the digital lighting. For example, specular reflection is an illumination which is reflected into a single direction. For example, the dimming may reduce the image intensity of the digital lighting from the specular reflection. In one example, the dimming reduces the specular reflection from a solar visible illumination.

In one example, a non-directional light may be a non-specular reflection from a solar visible illumination. That is, a non-specular reflection is an illumination which is reflected into a plurality of directions. In one example, a non-specular reflection is a Lambertian reflection, i.e., a perfectly diffuse reflection over a hemisphere.

In block 120, a plurality of digital materials of the lighting-modified 3D digital model is modified to generate a materials-modified 3D digital model based on a plurality of simulated characteristics. In one example, the 3D digital model uses physically based rendering (PBR) to store a plurality of image parameters (e.g., albedo color metric, roughness metric, metalness metric, transparency metric, etc.) for each point of a surface of the 3D digital model to represent the plurality of simulated characteristics. In one example, the plurality of image parameters may be used as inputs to shading calculations. In one example, PBR is used to approximate a bidirectional reflectance distribution function (BRDF) and a rendering equation. In one example, the BRDF describes reflectance properties of a surface as a function of lighting geometry and observation geometry. In one example, the rendering equation defines an integral relationship between an incident illumination function and a reflected illumination function using the BRDF as an integration kernel.

In one example, the albedo color metric is a numeric representation of relative reflectance vs. wavelength, λ, over a portion of an electromagnetic spectrum in a propagation medium for the plurality of digital materials. Alternatively, for example, the relative reflectance may be represented versus frequency, v, where frequency v and wavelength λ are reciprocally related via a speed of light, c, in the propagation medium (i.e., vλ=c). In one example, the portion of the electromagnetic spectrum may be visible light or a plurality of particular wavelengths. For example, a particular wavelength may correspond to a single monochromatic component, i.e., a particular color.

In one example, the roughness metric is a numeric representation of a variation of a surface height relative to a reference surface for the plurality of digital materials. For example, a reference surface may be a predetermined surface of a geometric object (e.g., sphere, cube, cone, ellipsoid, etc.). For example, the roughness metric may be described by a roughness statistical distribution. For example, the roughness statistical distribution may be a GGX distribution. In one example, the GGX distribution is a statistical distribution of normals of a truncated ellipsoid with a roughness parameter alpha. For example, the roughness metric may be described by a statistical parameter, such as rms surface variation, surface standard deviation, surface peak-peak variation, etc., based on the roughness statistical distribution.

In one example, the metalness metric is a numeric representation of metal proportion for the plurality of digital materials. For example, the metalness metric may represent the fraction of metal in the surface of the plurality of digital materials relative to the total quantity of metal and dielectric in the surface of the plurality of digital materials.

In one example, the transparency metric is a numeric representation of transmissivity through the surface of the plurality of digital materials. For example, the transparency metric may represent the fraction of incident illumination energy which is transmitted (e.g., not reflected) through the surface of the plurality of digital materials.

In one example, prior to generating the 3D print from the 3D digital model, the plurality of digital materials of the 3D digital model may be modified by tuning the plurality of image parameters (e.g., albedo color metric, roughness metric, metalness metric, transparency metric, etc.) for each point of a surface of the 3D digital model. For example, tuning the image parameters simulates how the plurality of digital materials respond to incident illumination energy.

In one example, the modification of the plurality of digital materials of the lighting-modified 3D digital model is implemented by using a linear weighted superposition of the plurality of image parameters and a plurality of conjugate parameters to yield a lighting scale metric, e.g., denoted as LightingScale. For example, the plurality of conjugate parameters is defined as the plurality of image parameters subtracted from unity. That is, for example, a first conjugate parameter is equal to 1 minus a first image parameter, a second conjugate parameter is equal to 1 minus a second image parameter, etc. In one example, the weighting may be implemented using a plurality of numeric weights.

For example, the linear weighted superposition may be represented mathematically by the following LightingScale algorithm:

$$\begin{aligned} LightingScale = {} & brightWeight * AlbedoColor + darkWeight * (1 - AlbedoColor) + \\ & roughWeight * \text{Roughness} + smoothWeight * (1 - \text{Roughness}) + \\ & metalWeight * \text{Metalness} + dielectricWeight * (1 - \text{Metalness}) + \\ & transparencyWeight * \text{Transparent} + opaqueWeight * (1 - \text{Transparent}). \end{aligned} \tag{1}$$

$$LightingScale = \text{clamp}(LightingScale, 0, 1). \tag{2}$$

For example, the definitions for each parameter in the LightingScale algorithm are:

$brightWeight$ = relative numeric weight for $AlbedoColor$ image parameter;

$darkWeight$ = relative number weight for $AlbedoColor$ conjugate parameter (i.e., $1 - AlbedoColor$);

$AlbedoColor$ = numeric parameter for albedo color metric;

$roughWeight$ = relative numeric weight for Roughness image parameter;

$smoothWeight$ = relative numeric weight for Roughness conjugate parameter (i.e., 1 − Roughness)

Roughness = numeric parameter for roughness metric;

$metalWeight$ = relative numeric weight for Metalness image parameter;

$dielectricWeight$ = relative numeric weight for Metalness conjugate parameter (i.e., 1 − Metalness);

Metalness = numeric parameter for metalness metric;

$transparencyWeight$ = relative numeric weight for Transparency image parameter;

$opaqueWeight$ = relative numeric weight for Transparency conjugate parameter (i.e., 1 − Transparency);

Transparency = numeric parameter for transparency metric.

In one example, the algorithm function y=Clamp(x,Min, Max) in the LightingScale algorithm is defined as a function with numeric input x, minimum parameter Min, maximum parameter Max and numeric output y such that:

$$\begin{aligned} y &= x && \text{for Min} \le x \le \text{Max}; \\ y &= \text{Min} && \text{for } x < \text{Min}; \\ y &= \text{Max} && \text{for } x > \text{Max}. \end{aligned}$$

That is, for example, the function y=Clamp(x, Min, Max) restricts the numeric output y to the range [Min, Max].

In one example, the LightingScale algorithm modifies how the plurality of digital materials of the 3D digital model responds to incident illumination energy; that is, a digital materials response. For example, the digital materials response may represent a full natural lighting environment without modification or may represent a white light environment (i.e., ignoring the full natural lighting environment or similar to a photographic light box) or may represent a blend of the full natural lighting environment and the white light environment. In one example, the digital materials response may be governed by empirical selection of the plurality of numeric weights.

In block 130, one or more model parameters of the materials-modified 3D digital model are modified to generate a parameters-modified 3D digital model. In one example, the parameters-modified 3D digital model creates an illusion of scale. In one example, an ambient occlusion parameter of the materials-modified 3D digital model may be scaled to a lower non-zero value. In one example, the ambient occlusion parameter is a numeric representation of a visibility metric for each point on the surface of the materials-modified 3D digital model from a perspective outside of the materials-modified 3D digital model. In one example, the ambient occlusion parameter $P(\underline{s})$, at a surface location $\underline{s}$, may be represented as an occlusion integral expressed as:

$$P(\underline{s}) = \int\int \underline{n}\cdot\underline{r}\,O(\underline{s},\underline{r})\,d\Omega$$

where $O(\underline{s},\underline{r})$ = occlusion factor at surface location $\underline{s}$, = 0 if occluded, = 1 if not occluded;

$\underline{n}$ = normal vector of the surface;

integration range is a hemisphere over normalized direction vector $\underline{r}$.

In block 140, an interaction between a modified digital lighting and a modified digital material in the parameters-modified 3D digital model is transformed to generate a transformed 3D digital model. In one example, calculations used to simulate the interaction among a) the modified digital lighting, b) surfaces and c) modified digital materials may be transformed to be view-independent. In one example, the transformed 3D digital model is view-independent. For example, the transformed calculations may be performed for multiple samples across the surface of the 3D digital model either for viewing as pixels for a digital display or for viewing as color values for points in a 3D printed model. In one example, the 3D printed model is the 3D print. In one example, the 3D print is a 3D color print.

In block 150, the transformed 3D digital model is rasterized into a parameter space of a 3D model file to generate a rasterized 3D digital model. In one example, rasterization produces an output as a triangular mesh with texture coordinates per triangle corner and a color texture image. In one example, the 3D model file is used as an input for 3D printing.

In block 160, the rasterized 3D digital model is provided to a 3D printer to create a 3D print. In one example, the 3D print is a 3D color print. In one example, the 3D print is a physical assembly of shapes based on the rasterized 3D digital model to produce a physical object. In one example, the 3D print is a product of an additive manufacturing process; that is, a manufacturing process which produces the physical assembly of shapes by the addition of materials rather than by removal of materials. In one example, the 3D print is a product of a manufacturing process which creates a physical object with control over the surface color, but with a limited palette of materials (e.g., gray foundation with color overlay).

Figure 2:
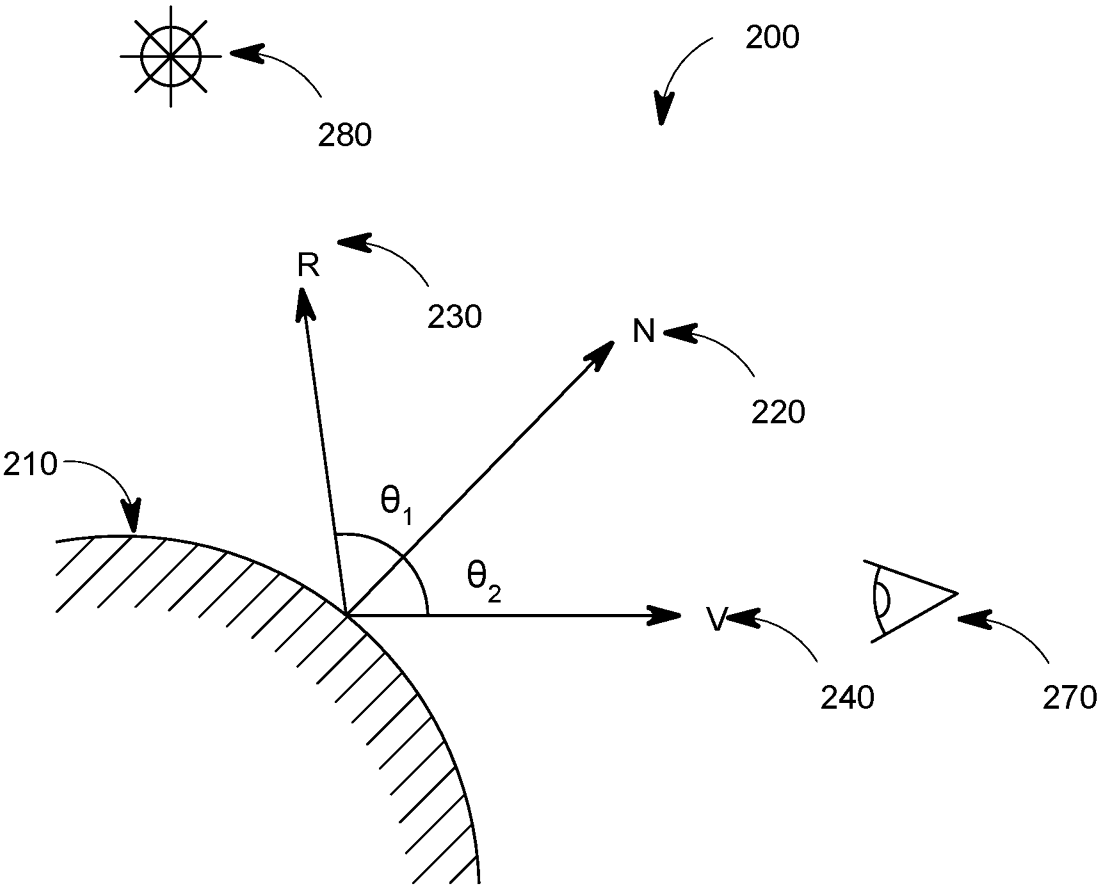
FIG. 2 illustrates an example initial viewing geometry for the 3D digital model with a surface.

FIG. 2 illustrates an example initial viewing geometry 200 for the 3D digital model with a surface 210. For example, the surface 210 has a normal vector $\underline{N}$ 220 which bisects a reflectance vector $\underline{R}$ 230 and a viewing vector $\underline{V}$ 240. In one example, the reflectance vector $\underline{R}$ 230 has a first angle $\theta_1$ with respect to the normal vector $\underline{N}$ 220. In one example, the viewing vector $\underline{V}$ 240 has a second angle $\theta_2$ with respect to the normal vector $\underline{N}$ 220. In one example, the first angle $\theta_1$ is equal to the second angle $\theta_2$. In one example, the viewing vector $\underline{V}$ 240 has a projected direction towards a viewer 270. In one example, a light source 280 serves as an illumination source for the initial viewing geometry 200.

Figure 3:
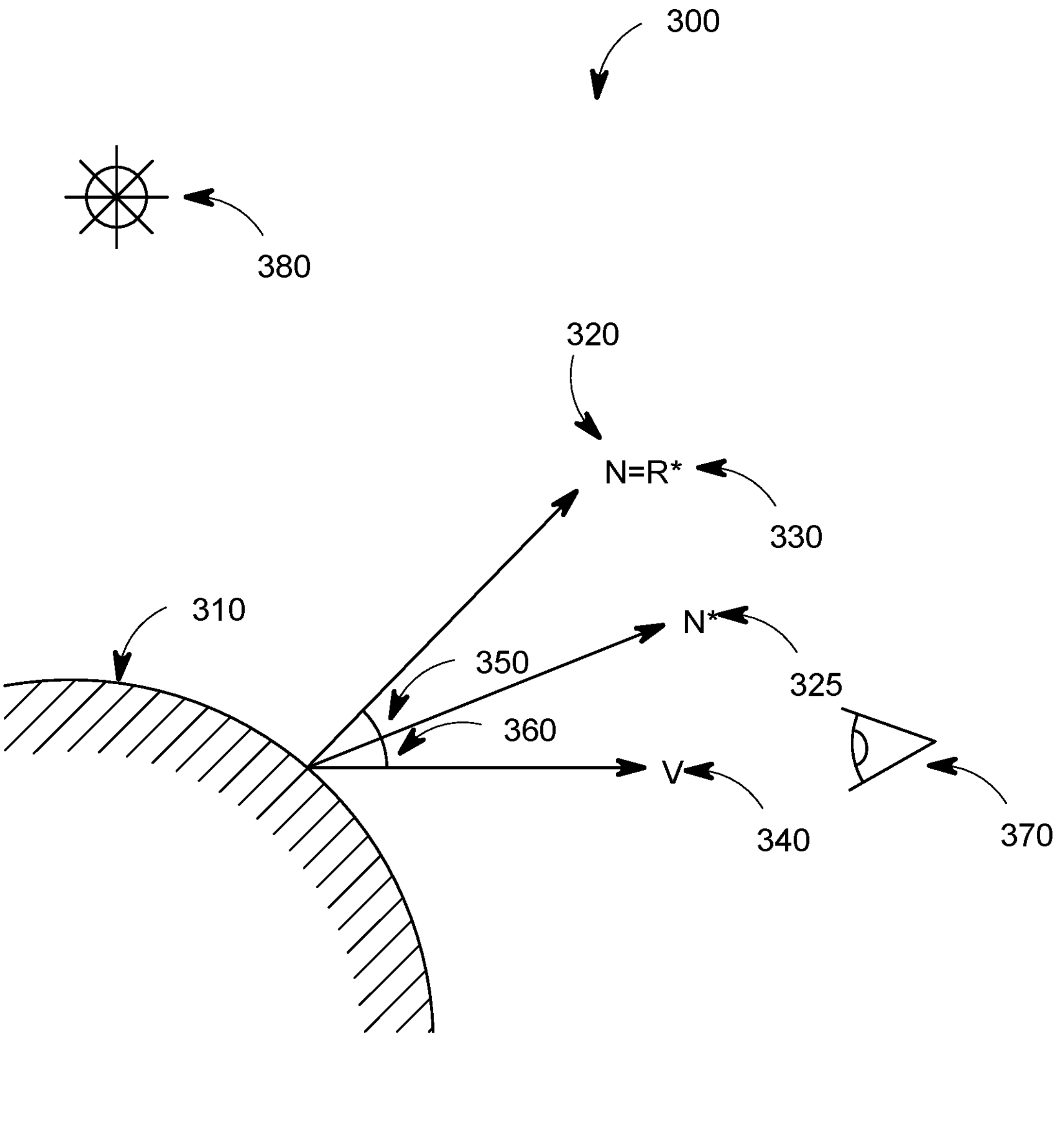
FIG. 3 illustrates an example transformed viewing geometry for the 3D digital model with a surface.

FIG. 3 illustrates an example transformed viewing geometry 300 for the 3D digital model with a surface 310. In one example, the surface 310 has a normal vector $\underline{N}$ 320 which is coincident with a reference reflectance vector $\underline{R}$* 330. In one example, the surface 310 has a viewing vector $\underline{V}$ 340. In one example, a transformed normal vector $\underline{N}$* 325 bisects the reference reflectance vector $\underline{R}$* 330 and the viewing vector $\underline{V}$ 340. In one example, the reference reflectance vector $\underline{R}$* 330 has a first transformed angle 350 with respect to the transformed normal vector $\underline{N}$* 325. In one example, the viewing vector $\underline{V}$ 340 has a second transformed angle 360 with respect to the transformed normal vector $\underline{N}$* 325. In one example, the first transformed angle 350 is equal to the second transformed angle 360. In one example, the first transformed angle 350 is equal to one half of the first angle $\theta_1$ in FIG. 2 and the second transformed angle 360 is equal to one half of the second angle $\theta_2$ in FIG. 2. In one example, the viewing vector $\underline{V}$ 340 has a projected direction towards a viewer 370. In one example, a light source 380 serves as an illumination source for the transformed viewing geometry 300.

In one example, a specular reflection may traverse the surface as the viewing vector $\underline{V}$ 340 changes. For example, these traversing highlights may significantly contribute to the visual character of the surface but may not be represented adequately in a 3D print since printers can print only a limited set of physical materials. In one example, to represent the visual character of the surface, the specular reflection may be fixed in place in the 3D digital model by modifying the sample direction to be closer to the surface normal (i.e., the reference reflectance vector $\underline{R}$* 330 in FIG. 3). For example, the reference reflectance vector $\underline{R}$* 330 may be selected in a fixed direction independent of the viewing vector $\underline{V}$ 340 location.

Figure 4:
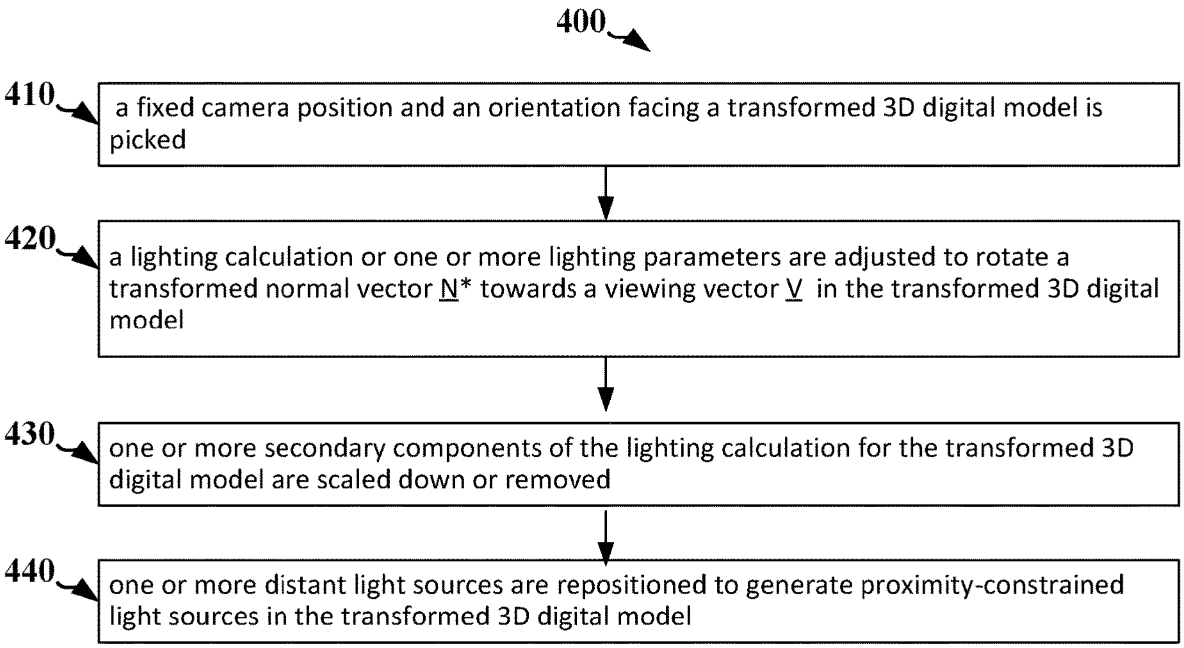
FIG. 4 illustrates an example subflow diagram for generating a transformed 3D digital model.

FIG. 4 illustrates an example subflow diagram 400 for generating a transformed 3D digital model. In one example, the transformed 3D digital model generated by the example subflow diagram 400 is the transformed 3D digital model of FIG. 1, block 140.

In block 410, a fixed camera position and an orientation facing the transformed 3D digital model is picked. For example, the fixed camera position and the orientation are shown as the viewer 270 in FIG. 2 and as viewer 370 in FIG. 3.

In block 420, a lighting calculation or one or more lighting parameters are adjusted to rotate a transformed normal vector $\underline{N}$* 325 towards a viewing vector $\underline{V}$ 340 in the transformed 3D digital model. For example, rotating the transformed normal vector $\underline{N}$* 325 adjusts the lighting calculation or the one or more lighting parameters to move the reflectance vector $\underline{R}$ 230 parallel to the normal vector $\underline{N}$ 220. In one example, the transformed normal vector $\underline{N}$* 325 is halfway, within an angular tolerance α, between the reference reflectance vector $\underline{R}$* 330 and the viewing vector $\underline{V}$ 340. That is, the transformed normal vector $\underline{N}$* 325 bisects the reference reflectance vector $\underline{R}$* 330 and the viewing vector $\underline{V}$ 340, within the angular tolerance α. In one example, the angular tolerance α may be bounded by ±5%. For example, the rotation of the transformed normal vector $\underline{N}$* 325 in this manner makes most view dependent calculations consistent and minimizes extensive lighting calculation. For example, if specular reflections are fixed in place, their locations may be represented by appropriate color values for the 3D color print.

In block 430, one or more secondary components of the lighting calculation for the transformed 3D digital model are scaled down or removed. In one example, a subset of the lighting calculation, for example, view-dependent components of the lighting calculation, may be scaled by a factor less than unity either to disable them or to reduce their contribution to the 3D print. In one example, sheen effects may be entirely removed. In one example, the effect of ambient occlusion on specular reflections may be scaled by a cosine-weighted mean vector dot product of the normal vector $\underline{N}$ 320 and the viewing vector $\underline{V}$ 340 over a view hemisphere. In one example, the view hemisphere is a hemispherical volume (i.e., 2π steradians solid angle) centered around the viewing vector $\underline{V}$ 340.

In block 440, one or more distant light sources are repositioned to generate proximity-constrained light sources in the transformed 3D digital model. In one example, to create illumination variation over flat surfaces, the one or more distant light sources may be repositioned to be proximity constrained within a bounding sphere of radius R around the transformed 3D digital model. In one example, the bounding sphere is centered around a center of mass of the transformed 3D digital model. In one example, the bounding sphere has a minimum bounding sphere radius $R_{min}$ which is the smallest radius of a sphere which totally encloses the transformed 3D digital model.

In one example, the location of a distant light source (i.e., one of the one or more distant light sources) at an initial position $p_0$ may be artificially repositioned to a proximity-constrained position $\underline{p}_1$ which lies on the surface of the bounding sphere of radius R. In one example, the radius R of the bounding sphere may be between a factor 2 and a factor of 10 relative to the minimum bounding sphere radius $R_b$. That is, the bounding sphere radius R may be selected such that $2R_{min} \leq R \leq 10R_{min}$.

Figure 5:
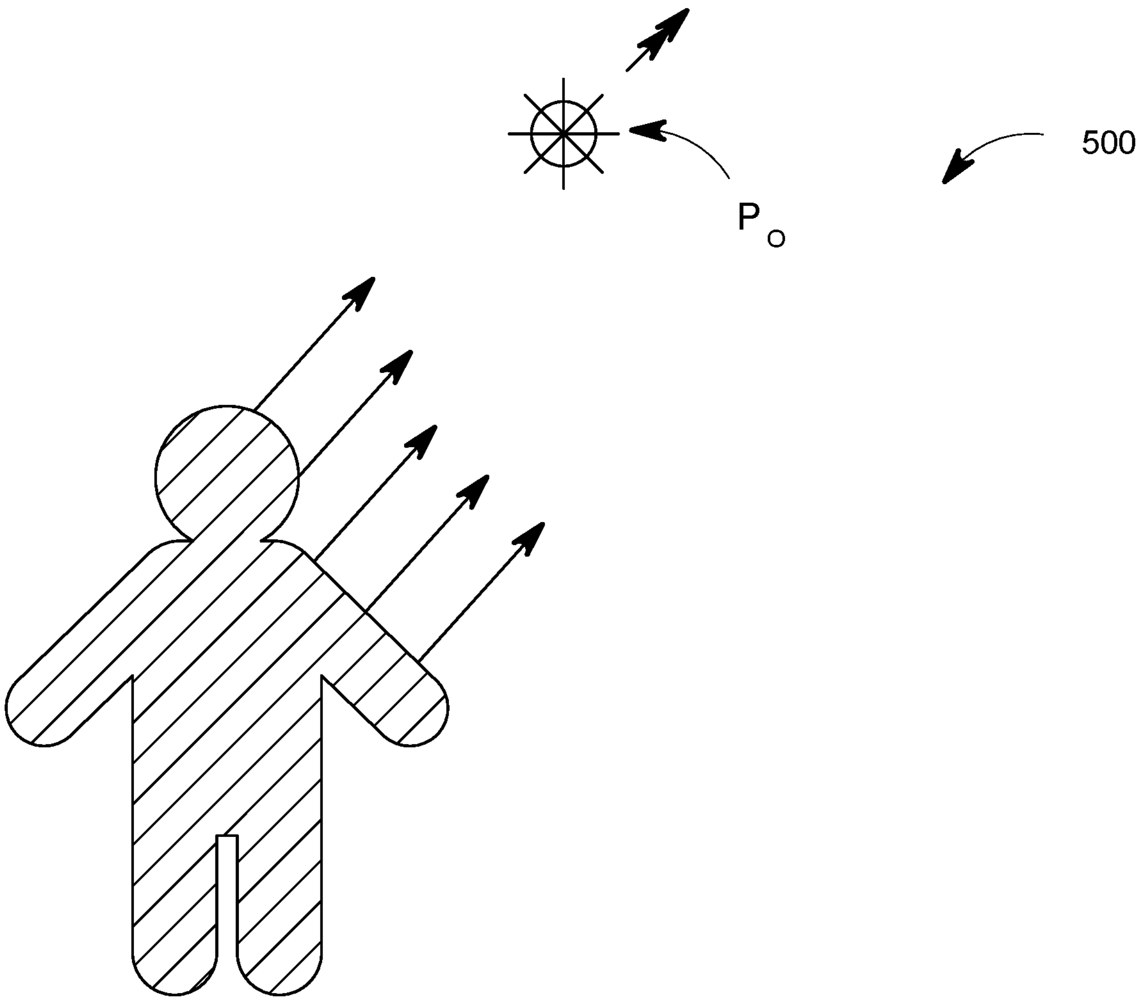
FIG. 5 illustrates an example of an image with a distant light source.

FIG. 5 illustrates an example 500 of an image with a distant light source. In the example, FIG. 5 illustrates the distant light source located at the initial position $p_0$ which is at a distance d from the 3D digital model such that its illumination rays to all points on the surface of the 3D digital model are essentially parallel. That is, the illumination rays may be considered parallel if all illumination rays emitted from initial position $p_0$ which impinge on the surface of the 3D digital model are parallel within a parallel angular tolerance β (not shown). In one example, the parallel angular tolerance β may be bounded by a numerical accuracy of the 3D digital model (e.g., $10^{-7}$). For example, parallel illumination rays may cause undesired specular reflections on flat surfaces normal to the parallel illumination rays (i.e., an unpleasantly uniform appearance may result from parallel illumination rays).

Figure 6:
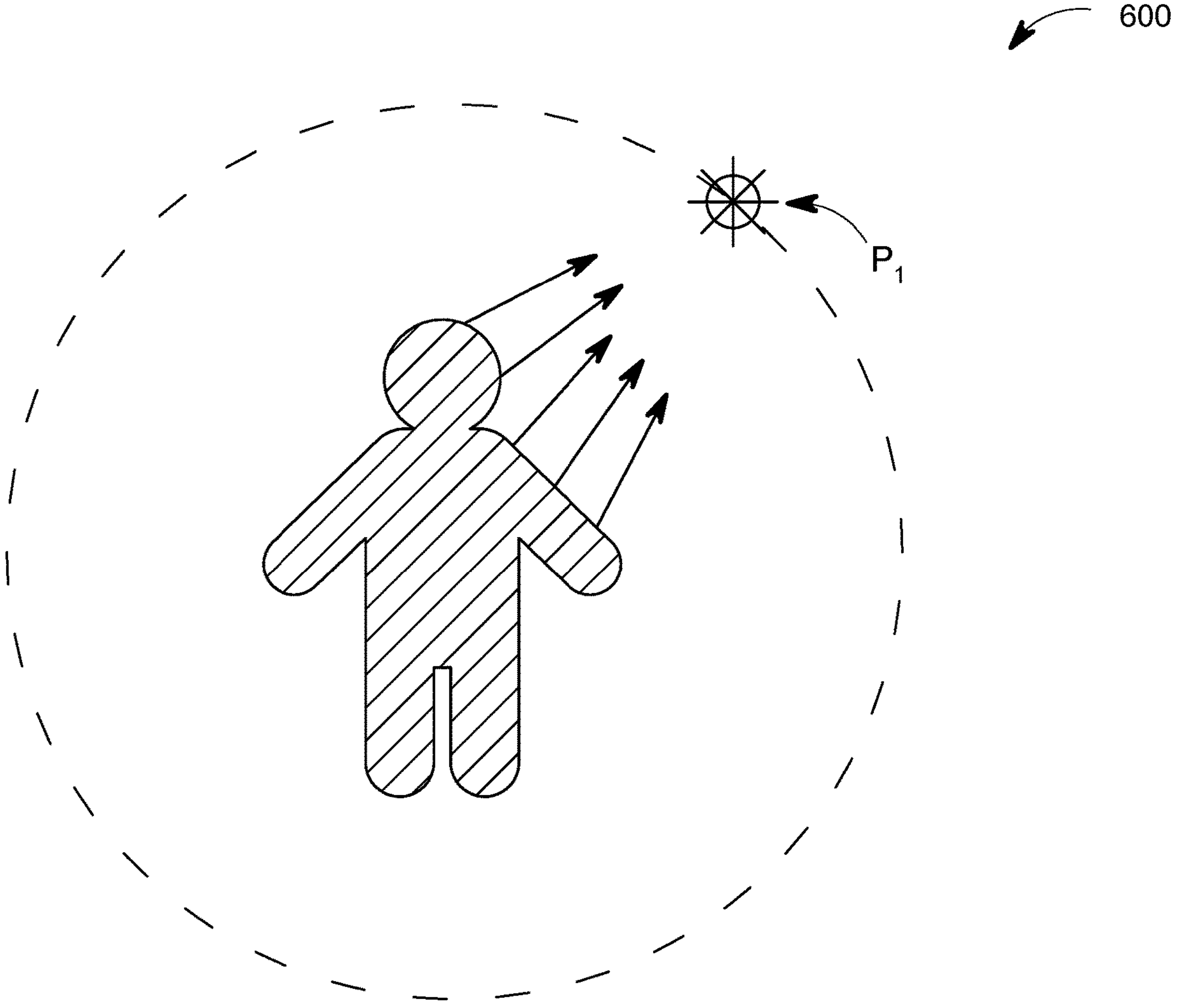
FIG. 6 illustrates an example of an image with a proximity-constrained light source.

FIG. 6 illustrates an example 600 of an image with a proximity-constrained light source. In the example, FIG. 6 illustrates the proximity-constrained light source located at the proximity-constrained position $\underline{p}_1$ which lies on the surface of the bounding sphere of radius R. In one example, this geometry prevents highlights from spanning flat surfaces and obscuring other detail. In one example, the proximity-constrained position $\underline{p}_1$ is used to calculate directions from the surface to the proximity-constrained light source using the same lighting calculations as described previously. For example, the repositioning of distant light sources may also be performed for other light sources which are nearer than the distant light sources but outside the bounding sphere of radius R.

Figure 7:
FIG. 7 illustrates an example 3D digital model with material response to illumination.

FIG. 7 illustrates an example 3D digital model 700 with a material response to illumination. In one example, the 3D digital model 700 with the material response is a result of block 120 of FIG. 1, a materials-modified 3D digital model.

Figure 8:
FIG. 8 illustrates an example of a rasterized 3D digital model.

FIG. 8 illustrates an example of a rasterized 3D digital model 800. In one example, the rasterized 3D digital model 800 is a result of block 150 of FIG. 1. For example, dynamic material responses may be wrapped across the model to create a static surface suitable for a 3D print. For example, shiny surfaces on the model are not dynamic, but become static as a result of the rasterization.

Figure 9:
FIG. 9 illustrates an example digital pelt which represents color textures of the rasterized 3D digital model.

FIG. 9 illustrates an example digital pelt 900 which represents color textures of the rasterized 3D digital model 800. In one example, the digital pelt 900 represents the outer surface of a 3D digital model. For example, roughness, metalness, incandescence, ambient occlusion, etc. are all captured in the digital pelt 900.

Figure 10:
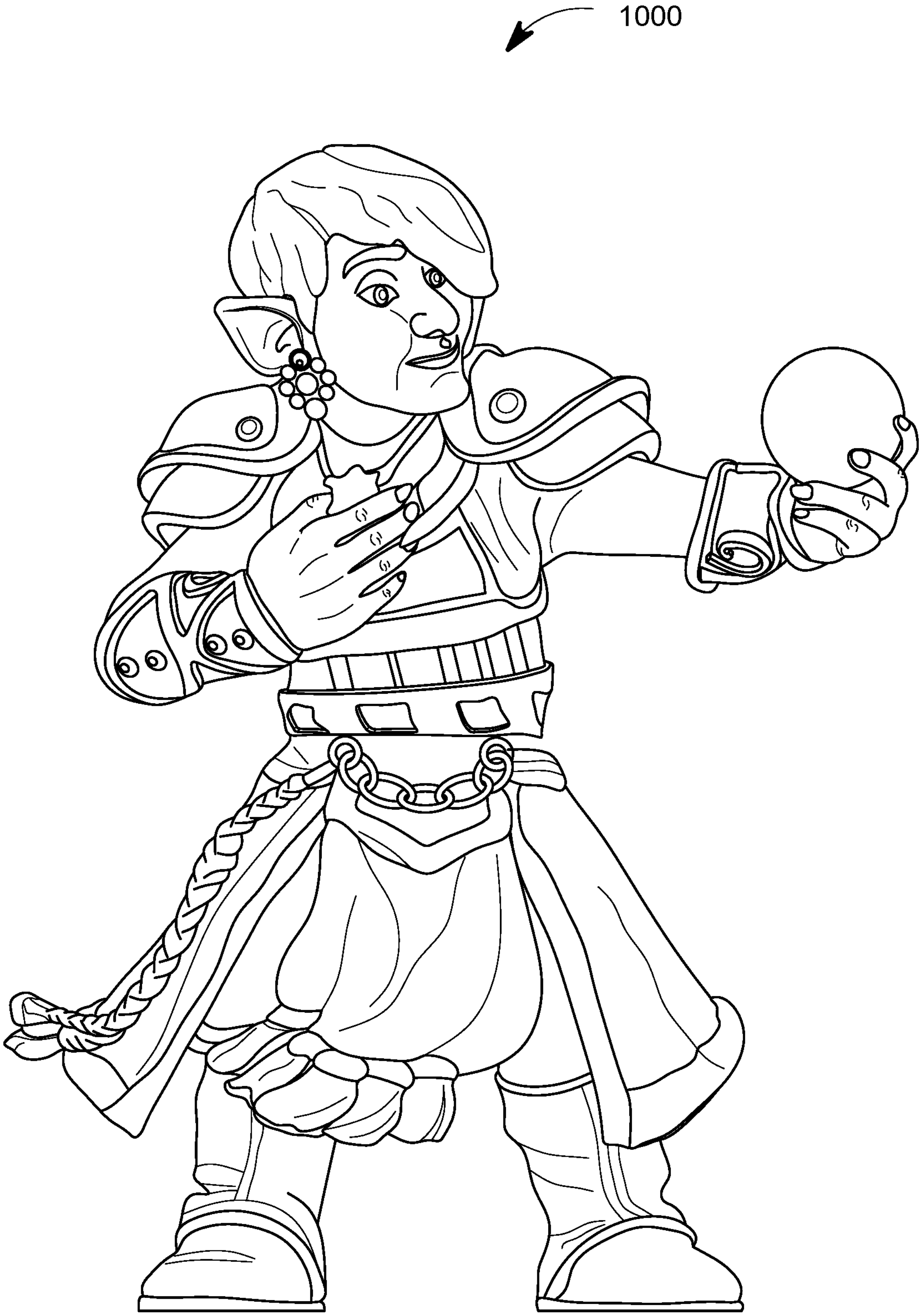
FIG. 10 illustrates a first example 3D print with lighting, such as point lights.

FIG. 10 illustrates a first example 3D print 1000 with lighting, such as point lights. For example, the 3D print of FIG. 10 includes a blue light in facial features. For example, the user may modify the lighting setup to provide more realistic 3D prints for different real-life locations or different visual moods for the 3D print 1000.

Figure 11:
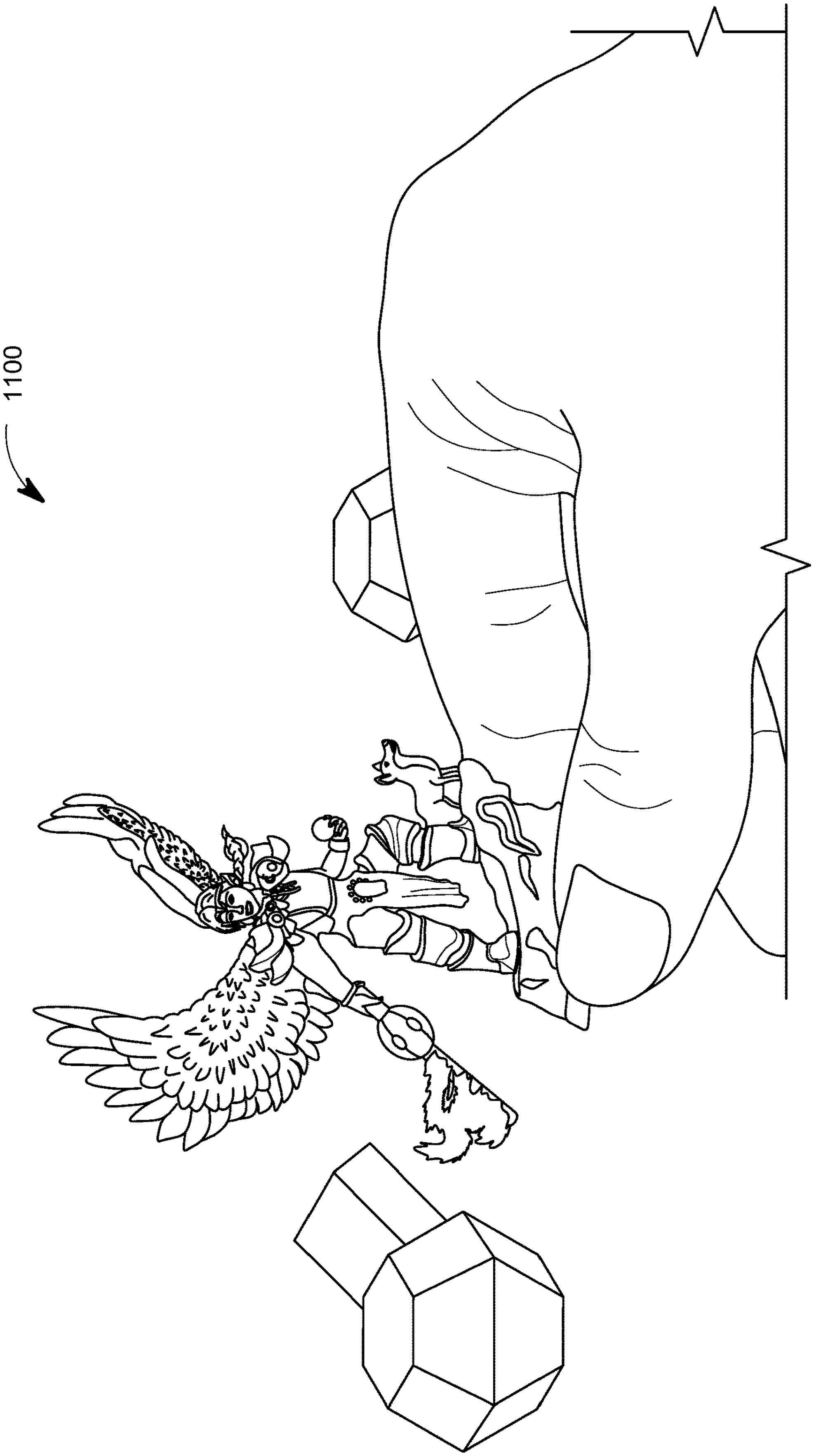
FIG. 11 illustrates a second example 3D print shown in a perspective view.

FIG. 11 illustrates a second example 3D print 1100 shown in a perspective view. For example, the second example 3D print 1100 may be generated using the steps disclosed in the blocks of FIG. 1.

In one aspect, one or more of the steps in FIGS. 1 and 4 may be executed by one or more processors which may include hardware, software, firmware, etc. In one aspect, one or more of the steps in FIGS. 1 and 4 may be executed by one or more processors which may include hardware, software, firmware, etc. The one or more processors, for example, may be used to execute software or firmware needed to perform the steps in the flow diagrams of FIGS. 1 and 4. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. A method for generating a three-dimensional (3D) print, the method comprising:

modifying a plurality of digital materials of a lighting-modified 3D digital model to generate a materials-modified 3D digital model based on a plurality of simulated characteristics;

modifying one or more model parameters of the materials-modified 3D digital model to generate a parameters-modified 3D digital model;

transforming an interaction between a modified digital lighting and a modified digital material in the parameters-modified 3D digital model to generate a transformed 3D digital model by rotating a reflectance vector parallel to a normal vector;

rasterizing the transformed 3D digital model into a parameter space of a 3D model file to generate a rasterized 3D digital model; and providing the rasterized 3D digital model to a 3D printer to create a 3D print.

2. The method of claim 1, further comprising modifying a digital lighting of a three-dimensional (3D) digital model to generate the lighting-modified 3D digital model.

3. The method of claim 2, further comprising configuring the lighting-modified 3D digital model to attenuate one or more directional light paths.

4. The method of claim 3, further comprising attenuating the one or more directional light paths by dimming the digital lighting from a specular reflection.

5. The method of claim 2, further comprising configuring the 3D digital model to use a physically based rendering (PBR) to store one or more image parameters for each point of a surface of the 3D digital model to represent one or more simulated characteristics.

6. The method of claim 5, further comprising using the one or more image parameters as inputs to a shading calculation.

7. The method of claim 5, further comprising using the physically based rendering (PBR) to approximate a bidirectional reflectance distribution function (BRDF) and a rendering equation.

8. The method of claim 7, wherein the bidirectional reflectance distribution function (BRDF) describes one or more reflectance properties of the surface as a function of lighting geometry and observation geometry.

9. The method of claim 7, wherein the rendering equation defines a relationship between an incident illumination function and a reflected illumination function using the bidirectional reflectance distribution function (BRDF).

10. The method of claim 5, wherein the one or more image parameters include at least one of the following: an albedo color metric, a roughness metric, a metalness metric, or a transparency metric.

11. The method of claim 10, wherein the albedo color metric is a numeric representation of relative reflectance versus wavelength λ over a portion of an electromagnetic spectrum in a propagation medium for the plurality of digital materials.

12. The method of claim 10, wherein the roughness metric is a numeric representation of a variation of a surface height relative to a reference surface for the plurality of digital materials.

13. The method of claim 10, wherein the metalness metric is a numeric representation of metal proportion for the plurality of digital materials.

14. The method of claim 10, wherein the transparency metric is a numeric representation of transmissivity through a surface of the plurality of digital materials.

15. The method of claim 1, wherein an ambient occlusion parameter of the materials-modified 3D digital model is an occlusion integral.

16. The method of claim 15 further comprising scaling the ambient occlusion parameter of the materials-modified 3D digital model to a lower non-zero value.

17. The method of claim 1, wherein the modifying the plurality of digital materials of the lighting-modified 3D digital model is implemented by using a linear weighted superposition of one or more image parameters and one or more conjugate parameters.

18. The method of claim 1, wherein the transformed 3D digital model is view-independent.

* * * * *